Patented Aug. 9, 1938

2,126,096

UNITED STATES PATENT OFFICE 2,126,096

POLISHING COMPOSITION

Hubert Deguide, Enghien, France

No Drawing. Application February 28, 1935, Serial No. 8,737. In France March 7, 1934

2 Claims. (Cl. 134—24)

The present invention relates to the manufacture of polishes for floors, furniture, boots, etc.

I have discovered that when barium soaps (obtained by saponification of fatty matters in the hot state by barium hydroxide in solution) are dissolved, in the hot state, by spirit of turpentine, white spirit, toluene, trichloroethylene, and analogous mineral spirits, with the addition of colouring matters, there are obtained, after cooling, colloidal jellies which are very stable within a wide range of temperatures and which constitute products adapted to be used as polishes for floors, furniture, boots, etc.

These products leave, on surfaces treated with them, after evaporation of the solvent, a wax-like coating which, after rubbing, becomes very shiny. These products have the advantage, over polishes such as used at the present time, that the solvent does not exude, even at the highest atmospheric temperatures, so that the polishes according to the present invention do not require hermetic packing for storing and transportation.

I have found that particularly satisfactory results are obtained by making use of a barium salt resulting from the treatment of a mixture of linseed oil and tallow (for instance two parts in weight of linseed oil for one part in weight of tallow) in the hot state by barium hydroxide in a sufficient amount for ensuring a substantially complete saponification of the whole of the fatty bodies, and by dissolving this barium salt in the hot state in spirit of turpentine, white spirit, trichlorethylene, toluene, or a mixture of these solvents.

Examples of the process according to the present invention will be hereinafter described.

*Example I.*—40 kilogrammes of linseed oil, 20 kilogrammes of ox tallow, 40 kilogrammes of crystallized barium hydroxide ($BaO_2H_2,8H_2O$) and 40 kilogrammes of water are introduced into an autoclave, provided with a jacket and a stirring and mixing device. The autoclave is then closed and heated by circulating steam through its jacket, so as to dissolve the barium hydroxide in water and melt the tallow. Once this result is obtained, the stirring and mixing device is started, while heating until the temperature reaches 120° C. Once this temperature has been obtained, it is maintained for one hour, while the matters are stirred and mixed.

The inflow of steam is then stopped, and cold water is introduced into the jacket. The stirring and mixing device is kept in operation until the temperature has dropped down to 95° C.

This device is then stopped. There is then discharged from the autoclave glycerin water, containing the glycerin of the fatty bodies that have been used, and eventually a small amount of barium hydroxide, which was in excess. This small excess of barium hydroxide is easily eliminated by causing carbonic acid to bubble through said glycerin water. Barium carbonate precipitates and the glycerin water may be used for various known uses.

The soap of barium that remains in the autoclave can be poured into moulds where it cools and becomes solid.

Before pouring this soap of barium into the molds, paraffin, animal or vegetal wax, or a mixture of these substances, may be added to said soap. For instance I may add to the soap of barium remaining in the autoclave, and the weight of which is about 90 kilogrammes in the moist state, 46 kilogrammes of paraffin (the melting point of which is 50–52° C.) and 28 kilogrammes of carnauba or candelilla wax.

The whole is heated at a temperature of about 100° C., mixed together, and poured into moulds. There is thus obtained 164 kilogrammes of a mixed product. This product is rasped and 46 kilogrammes thereof are introduced into a closed reservoir which may be heated by means of steam. A suitable solvent, for instance 82 kilogrammes of spirit of turpentine or white spirit, or 55 kilogrammes of turpentine mixed with 27 kilogrammes of trichlorethylene, is added. A suitable colouring matter, for instance, orange stearate, is also added.

The whole is heated at a temperature of about 100° C., while stirring the mass; when the colloidal dispersion or dissolution is finished, the mass is allowed to cool, while stirring down to a temperature of 70° C. and the product is poured into boxes.

I obtain in this way a very lustrous polish for floors or furniture. Its drip point, measured with the Ubel-Höde apparatus, is 57° C. This polish is colloidal. It may be packed in boxes that are not rendered hermetic by soldering but are obtained by stamping. The solvent in the polish does not sweat out, even at the highest atmospheric temperatures. It is not necessary to add thereto ozocerites or paraffins having a high melting point for maintaining them in a good state at these high atmospheric temperatures.

*Example II.*—The composition of matter above described, containing the barium soap, paraffin and wax, can also be used for making boot polish.

It suffices to add thereto, together with the mineral spirit acting as a dissolving or dispersing agent, a black colouring matter, such as nigrosin stearate and carbon black, in the proportion of 2% of nigrosin stearate and 1% of carbon black.

*Example III.*—The barium soap is prepared in the same manner as in Example I. 30 kilogrammes of this barium salt are dispersed, at a temperature of 100° C., in 70 kilogrammes of turpentine and a colouring agent in the autoclave, without adding paraffin or wax. The mass is allowed to cool and poured into moulds at a temperature of 70° C. I obtain a polish for floors or furniture the Ubel-Hode point of which is 65° C.

*Example IV.*—A barium salt is prepared with castor oil. In this case I heat in the autoclave, at a temperature of 120° C., a mixture of 60 kilogrammes of castor oil, 32 kilogrammes of barium hydrate and 40 kilogrammes of water. I obtain about 76 kilogrammes of barium soap.

In order to manufacture a boot polish with this product, I add to 30 kilogrammes of this barium soap 10 kilogrammes of a paraffin the melting point of which is 50–52° C., 70 kilogrammes of spirit of turpentine, 2 kilogrammes of nigrosine stearate and 1 kilogramme of carbon black. I heat the whole in an autoclave at a temperature of 105° C.; I allow the mass to cool and I pour it into moulds at a temperature of 70° C. The Ubel-Hode point of the boot polish thus obtained is 66° C.

In the process above described, barium hydroxide may be replaced, either wholly or partly, by lime or magesia for making the soap. I thus obtain polishes which, although inferior to those obtained from barium salts, still possess interesting properties.

What I claim is:

1. A polish, comprising a mixture of barium stearate 55% by weight, paraffin of melting point 50°–52° C. 28% by weight, hard wax 17% by weight, colloidally dispersed in spirits of turpentine in a stable gelled condition.

2. A polish, comprising a mixture of barium stearate, 55% by weight, paraffin, melting point 50°–52° C. 28% by weight, hard wax 17% by weight, a coloring matter and turpentine all in the form of a stable colloidal jelly.

HUBERT DEGUIDE.